United States Patent
Song

(10) Patent No.: US 11,456,445 B2
(45) Date of Patent: Sep. 27, 2022

(54) ELECTRODE, METHOD FOR MANUFACTURING THE SAME, ELECTRODE ASSEMBLY, AND SECONDARY BATTERY

(71) Applicant: LG CHEM, LTD., Seoul (KR)

(72) Inventor: Eun Jeong Song, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 192 days.

(21) Appl. No.: 16/607,230

(22) PCT Filed: Nov. 12, 2018

(86) PCT No.: PCT/KR2018/013738
§ 371 (c)(1),
(2) Date: Oct. 22, 2019

(87) PCT Pub. No.: WO2019/112196
PCT Pub. Date: Jun. 13, 2019

(65) Prior Publication Data
US 2020/0388819 A1 Dec. 10, 2020

(30) Foreign Application Priority Data
Dec. 7, 2017 (KR) .................. 10-2017-0167727

(51) Int. Cl.
*H01M 50/533* (2021.01)
*H01M 4/04* (2006.01)
(Continued)

(52) U.S. Cl.
CPC ........ *H01M 4/0404* (2013.01); *H01M 10/04* (2013.01); *H01M 10/44* (2013.01); *H01M 50/531* (2021.01)

(58) Field of Classification Search
CPC ............. H01M 50/531; H01M 50/533; H01M 50/538; H01M 2/30
(Continued)

(56) References Cited

U.S. PATENT DOCUMENTS

2002/0061435 A1 5/2002 Hisai
2006/0008702 A1 1/2006 Cheon et al.
(Continued)

FOREIGN PATENT DOCUMENTS

CN 101517806 A 8/2009
CN 104241578 A 12/2014
(Continued)

OTHER PUBLICATIONS

Extended European Search Report dated May 6, 2020 for corresponding European Application No. 18885232.1.
(Continued)

*Primary Examiner* — Tabassom Tadayyon Eslami
(74) *Attorney, Agent, or Firm* — Birch, Stewart, Kolasch & Birch, LLP

(57) ABSTRACT

An electrode including: a coating part coated with an electrode active material; and an electrode tab part provided on one side of the coating part, wherein the electrode tab part includes: a first electrode tab connected to the one side of the coating part; and a second electrode tab connected to the first electrode tab and bent in a direction of the first electrode tab to overlap one surface of the first electrode tab.

8 Claims, 9 Drawing Sheets

(51) Int. Cl.
  *H01M 10/04*     (2006.01)
  *H01M 10/44*     (2006.01)
  *H01M 50/531*    (2021.01)

(58) Field of Classification Search
  USPC .................................. 429/41, 240, 170, 178
  See application file for complete search history.

(56) References Cited

U.S. PATENT DOCUMENTS

| | | |
|---|---|---|
| 2009/0136840 A1 | 5/2009 | Kim |
| 2009/0237865 A1* | 9/2009 | Komazawa ............ H01G 9/012 |
| | | 29/25.03 |
| 2009/0305134 A1 | 12/2009 | Ryu |
| 2011/0081574 A1* | 4/2011 | Jo ..................... H01M 10/0585 |
| | | 429/211 |
| 2014/0370356 A1 | 12/2014 | Yi |
| 2016/0079574 A1* | 3/2016 | Song ................. H01M 10/0585 |
| | | 429/163 |
| 2016/0260952 A1 | 9/2016 | Park et al. |
| 2017/0025702 A1 | 1/2017 | Jung et al. |
| 2017/0040635 A1* | 2/2017 | Choi .................. B23K 35/3033 |
| 2017/0062792 A1 | 3/2017 | Baik et al. |
| 2017/0110713 A1 | 4/2017 | Otsuka |
| 2018/0241015 A1 | 8/2018 | You et al. |
| 2020/0014016 A1 | 1/2020 | Kim et al. |

FOREIGN PATENT DOCUMENTS

| | | |
|---|---|---|
| CN | 105428691 A | 3/2016 |
| JP | 2001-250516 A | 9/2001 |
| JP | 2002-157991 A | 5/2002 |
| JP | 2005-317367 A | 11/2005 |
| JP | 2006-19075 A | 1/2006 |
| JP | 2006-32112 A | 2/2006 |
| JP | 2008-91036 A | 4/2008 |
| JP | 2008-117614 A | 5/2008 |
| JP | 2015-126164 A | 7/2015 |
| JP | 2016-12542 A | 1/2016 |
| KR | 10-0178303 B1 | 4/1999 |
| KR | 10-2006-0097987 A | 9/2006 |
| KR | 10-0670514 B1 | 1/2007 |
| KR | 10-2009-0053470 A | 5/2009 |
| KR | 10-2009-0127398 A | 12/2009 |
| KR | 10-2016-0032930 A | 3/2016 |
| KR | 10-2016-0040087 A | 4/2016 |
| KR | 10-2016-0071222 * | 6/2016 |
| KR | 10-2016-0071222 A | 6/2016 |
| KR | 10-2017-0024417 A | 3/2017 |
| KR | 10-2017-0044416 A | 4/2017 |
| KR | 10-2017-0101857 A | 9/2017 |
| KR | 10-1783703 B1 | 10/2017 |
| KR | 10-2017-83703 * | 11/2017 |
| WO | WO 2016/006420 A1 | 1/2016 |
| WO | 2016/204410 * | 12/2016 |

OTHER PUBLICATIONS

International Search Report (PCT/ISA/210) issued in PCT/KR2018/013738, dated Feb. 15, 2019.

* cited by examiner

ELECTRODE, METHOD FOR MANUFACTURING THE SAME, ELECTRODE ASSEMBLY, AND SECONDARY BATTERY

CROSS-REFERENCE TO RELATED APPLICATION

The present application claims the benefit of the priority of Korean Patent Application No. 10-2017-0167727, filed on Dec. 7, 2017, which is hereby incorporated by reference in its entirety.

TECHNICAL FIELD

The present invention relates to an electrode, a method for manufacturing the same, an electrode assembly, and a secondary battery, and more particularly, to an electrode in which an electrode tab is improved in rigidity, a method for manufacturing the same, an electrode assembly, and a secondary battery.

BACKGROUND ART

In general, secondary batteries are chargeable and dischargeable unlike primary batteries that are not chargeable and are widely used in electronic devices such as mobile phones, notebook computers, camcorders, and the like, electric vehicles, or the like.

Such a secondary battery comprises an electrode assembly and a case accommodating the electrode assembly, and the electrode assembly has a structure in which a plurality of electrodes and a plurality of separators are alternately laminated. Also, an electrode tab is provided on the electrode, and an electrode lead is coupled to the electrode tab.

A lamination process is performed on the electrode assembly so that bonding force between the electrode and the separator increases. The lamination process comprises a transfer step of transferring each of an electrode provided with an electrode tab and a separator through a roller, a combining step of combining the electrode and the separator, which are transferred, through the roller, and a bonding step of rolling the electrode and the separator, which are combined with other, through the roller.

However, the electrode tab provided on the electrode may be easily bent by a load. Particularly, the electrode that is bent downward may be hung on the roller, and thus, the electrode tab may be folded or damaged.

In recent years, in order to obtain an increase in battery capacity, a collector of the electrode is reduced. Accordingly, the electrode tab formed on one side of the collector may also be reduced in thickness and thus be easily bent.

DISCLOSURE OF THE INVENTION

Technical Problem

To solve the above problems, an object of the present invention is to provide an electrode, in which an electrode tab increases in rigidity to prevent or reduce the electrode tab from being bent, particularly, to prevent the electrode tab from being caught by a roller when the electrode is transferred, and thus to prevent the electrode tab from being folded or damaged, a method for manufacturing the same, an electrode assembly, and a secondary battery.

Technical Solution

To achieve the above object, an electrode according to a first embodiment of the present invention includes: a coating part coated with an electrode active material; and an electrode tab part provided on one side of the coating part, wherein the electrode tab part includes: a first electrode tab connected to the one side of the coating part; and a second electrode tab connected to the first electrode tab and bent in a direction of the first electrode tab to overlap one surface of the first electrode tab.

The second electrode tab may include first and second connection pieces respectively connected to both side surfaces of the first electrode tab, and the first and second connection pieces may be bent in a direction of the one surface of the first electrode tab to correspondingly overlap the one surface of the first electrode tab.

Corresponding surfaces of the first and second connection pieces overlapping the first electrode tab may be closely attached or adjacent to each other.

The first electrode tab and the second electrode tab may have the same area.

The first electrode tab and the second electrode tab may be integrally bonded to each other through welding.

A method for manufacturing an electrode according to the first embodiment of the present invention includes: a step (a) of preparing a unfinished electrode including a coating part coated with an electrode active material and a non-coating part to which the electrode active material is not applied; a step (b) of notching the non-coating part to form an electrode tab part, wherein the electrode tab part includes a first electrode tab connected to one side of the coating part and a second electrode tab connected to the first electrode tab; and a step (c) of bending the second electrode tab in a direction of the first electrode tab to allow the second electrode tab to overlap one surface of the first electrode tab.

The step (b) may include: a first process of primarily notching both ends of the non-coating part formed on the unfinished electrode to form a primarily processed electrode tab part; and a second process of secondarily notching both sides of a boundary formed between the primarily processed electrode tab part and the coating part at each of quarters of the boundary to form an electrode tab part including a first electrode tab connected to the coating part and a second electrode tab including first and second connection pieces respectively connected to both side surfaces of the first electrode tab.

The method may further include, after the step (c), a step (d) of bonding the overlapping first and second electrode tabs to each other.

An electrode assembly according to a second embodiment of the present invention includes: a plurality of electrodes; and a separator interposed between the plurality of electrodes, wherein each of the plurality of electrodes includes: a coating part coated with an electrode active material; and an electrode tab part connected to one side of the coating part, wherein the electrode tab part includes: a first electrode tab connected to the one side of the coating part; and a second electrode tab connected to the first electrode tab and bent in a direction of the first electrode tab to overlap one surface of the first electrode tab.

A secondary battery according to a third embodiment of the present invention includes: an electrode assembly; and a pouch accommodating the electrode assembly, wherein the electrode assembly includes: a plurality of electrodes; and a separator interposed between the plurality of electrodes, wherein each of the plurality of electrodes includes: a coating part coated with an electrode active material; and an electrode tab part connected to one side of the coating part, wherein the electrode tab part includes: a first electrode tab connected to the one side of the coating part; and a second electrode tab connected to the first electrode tab and bent in a direction of the first electrode tab to overlap one surface of the first electrode tab.

A second electrode tab of an electrode according to a fourth embodiment of the present invention may be connected to one side surface of a first electrode tab and bent in a direction of the first electrode tab to overlap one surface of the first electrode tab.

A second electrode tab of an electrode according to a fifth embodiment of the present invention may be connected to a front end surface of a first electrode tab and bent in a direction of the first electrode tab to overlap one surface of the first electrode tab.

A second electrode tab of an electrode according to a sixth embodiment of the present invention may include first and second connection pieces respectively connected to both side surfaces of a first electrode tab, wherein the first connection piece is bent in a direction of one surface of the first electrode tab to overlap one surface of the first electrode tab, and the second connection piece is bent in a direction of the other surface of the first electrode tab to overlap the other surface of the first electrode tab.

Advantageous Effects

First: the electrode of the present invention may include the coating part and the electrode tab part. The electrode tab part may include the first electrode tab and the second electrode tab overlapping the first electrode tab. Thus, the electrode tab part may increase in rigidity to prevent the electrode tab part from being bent by the load, particularly, to prevent the electrode tab from being caught by the roller when the electrode is transferred, thereby preventing the defective electrode from being manufactured.

Second: in the electrode of the present invention, the second electrode tab may include first and second connection pieces respectively connected to both side surfaces of the first electrode tab. The first and second connection pieces may correspondingly overlap one surface of the first electrode tab. Thus, the outer circumferential surface of the electrode tab part may be curved to prevent the electrode tab part from being caught by the roller.

Third: according to the present invention, the corresponding surfaces of the first and second connection pieces, which overlap the first electrode tab, may be closely attached or adjacent to each other. Thus, the stepped portion may be prevented from being generated between the first and second connection pieces to minimize the increase in thickness of the electrode tab part.

Fourth: according to the present invention, the second electrode tab may be connected to only one side surface of the first electrode tab to overlap the one surface of the first electrode tab. Thus, the electrode tab part may be easily bent to improve the work efficiency.

Fifth: according to the present invention, the second electrode tab may include the first and second connection pieces. The first connection piece may overlap the one surface of the electrode tab, and the second connection piece may overlap the other surface of the electrode tab. Thus, the electrode tab part may more increase in rigidity to significantly prevent or reduce the electrode tab part from being bent.

Sixth, according to the present invention, the first electrode tab and the second electrode tab, which are provided in the electrode tab part, may have the same area. Thus, the first and second electrode tabs may increase in bonding force and adhesion force.

Seventh: according to the present invention, the first electrode tab and the second electrode tab, which are provided in the electrode tab part, may be integrally bonded to each other, particularly, integrally bonded to each other through the welding. Thus, the first and second electrode tabs may significantly increase in bonding force and adhesion force.

Eighth: the electrode assembly of the present invention may include the separator and the electrode. The electrode may include the coating part and the electrode tab part. The electrode tab part may include the first electrode tab and the second electrode tab connected to the first electrode tab and overlapping the first electrode tab. Thus, the electrode tab part may significantly increase in rigidity to prevent or reduce the electrode tab part from being bent. Therefore, the electrode tab part may be prevented or reduced from being folded or damaged to significantly reducing the defective rate of the electrode assembly.

Ninth: the secondary battery of the present invention may include the electrode assembly and the pouch. The electrode assembly may include the separator and the electrode. The electrode may include the coating part and the electrode tab part. The electrode tab part may include the first electrode tab and the second electrode tab connected to the first electrode tab and overlapping the first electrode tab. Thus, the electrode tab part may significantly increase in rigidity to prevent or reduce the electrode tab part from being bent. Therefore, the electrode tab part may be prevented or reduced from being folded or damaged to significantly reducing the defective rate of the secondary battery.

BRIEF DESCRIPTION OF THE DRAWINGS

FIGS. 3A to 3D are process views illustrating the method for manufacturing the electrode according to the first embodiment, wherein FIG. 3A is a plan view illustrating an electrode preparation step, FIG. 3B is a plan view illustrating a notching step, FIG. 3C is a plan view illustrating a forming step, and FIG. 3D is a plan view illustrating a bonding step.

MODE FOR CARRYING OUT THE INVENTION

Figure 1:
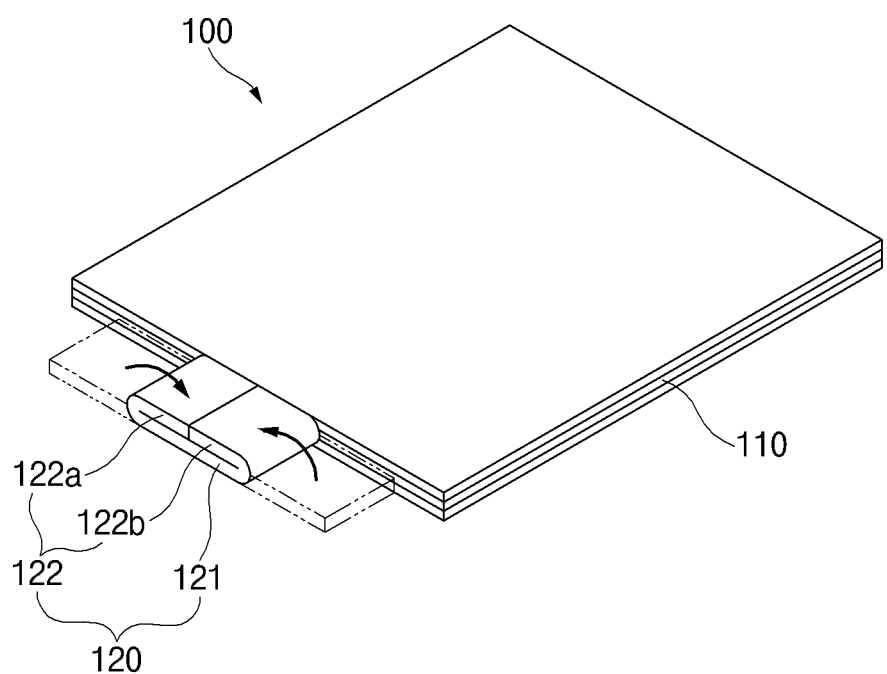
FIG. 1 is a perspective view of an electrode according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Electrode According to First Embodiment of the Present Invention]

As illustrated in FIG. 1, an electrode 100 according to a first embodiment of the present invention comprises a coating part 110 coated with an electrode active material and an electrode tab part 120 provided at one side of the coating part 110 without containing the electrode active material.

That is, in the electrode 100 according to the first embodiment of the present invention, the electrode active material is applied to one side of a collector made of a metal material to form the coating part 110, and a non-coating part, on which the electrode active material is not applied, is notched on the other side of the collector to form the electrode tab part 120.

The electrode tab part 120 may have a structure that is reinforced in rigidity so as to be prevented or reduced from being bent or folded by a load. That is, the electrode tab part 120 comprises a first electrode tab connected to one side of the coating part 110 and a second electrode tab overlapping one surface of the first electrode tab. As described above, the electrode tab part 120 may reinforce the rigidity of the electrode tab part 120 through a double structure comprising the first and second electrode tabs to prevent or reduce the electrode tab part 120 from being bent by the load.

For example, referring to FIG. 1, the electrode tab part 120 comprises a first electrode tab 121 connected to one side of the coating part 110 and a second electrode tab 122 connected to the first electrode tab 121 and bent in a direction of the first electrode tab 121 to overlap one surface of the first electrode tab 121. Here, the second electrode tab 122 comprises first and second connection pieces 122a and 122b respectively connected to both side surfaces of the first electrode tab 121. The first and second connection pieces 122a and 122b are bent in a direction of one surface of the first electrode tab 121 (a direction of a top surface of the first electrode tab when viewed in FIG. 1) to overlap the one surface of the first electrode tab 121. That is, the first connection piece 122a is bent with respect to a boundary between the first connection piece 122a and the first electrode tab 121 to overlap one side of one surface of the first electrode tab 121, and the second connection piece 122b is bent with respect to a boundary between the second connection piece 122b and the first electrode tab 121 to overlap the other side of the one surface of the first electrode tab 121.

The electrode tab part 120 having the above-described structure may significantly increase in rigidity through the double structure of the first and second electrode tabs 121 and 122 to prevent or reduce the electrode tab part 120 from being bent.

The corresponding surfaces of the first and second connection pieces 122a and 122b, which overlap the one surface of the first electrode tab 121, may be closely attached or adjacent to each other. That is, the corresponding surfaces of the first and second connection pieces 122a and 122b may be closely attached or adjacent to each other so that a gap is not generated between the corresponding surfaces of the first and second connection pieces 122a and 122b. Thus, a stepped portion may be prevented from being generated by the electrode tab part 120 to minimize an increase in thickness. Particularly, an accident due to introduction of foreign substances between the first and second connection pieces 122a and 122b may be previously prevented.

The first electrode tab 121 and the second electrode tab 122 may have the same area. That is, the first electrode tab 121 and the second electrode tab 122 may overlap each other with the same area to reinforce the rigidity of the entire one surface of the first electrode tab 121.

The first electrode tab 121 and the second electrode tab 122 may be bonded to each other through welding. That is, the first electrode tab 121 and the second electrode tab 122 may be integrally bonded to each other through the welding without being separated from each other. Thus, adhesion force and bonding force between the first electrode tab 121 and the second electrode tab 122 may increase.

Thus, the electrode 100 according to the first embodiment of the present invention comprises the electrode tab part constituted by the first electrode tab 121 and the second electrode tab 122. Thus, the electrode tab part 120 may significantly increase in rigidity to prevent or reduce the electrode tab part 120 from being bent by the load. Particularly, the electrode tab part 120 may be constituted by the first electrode tab 121 and the second electrode tab 122 to significantly reduce resistance, thereby improving safety of the electrode.

The first electrode tab 121 and the second electrode tab 122 may have thicknesses different from each other. That is, the second electrode tab 122 may have a thickness less than that of the first electrode tab 121. Thus, the second electrode tab 121 may be easily bent to overlap the first electrode tab 121. Also, the boundary between the first electrode tab 121 and the second electrode tab 122 may be easily identified without a separate notice.

Hereinafter, a method for the electrode 100 according to the first embodiment of the present invention will be described.

[Method for Manufacturing Electrode According to First Embodiment of the Present Invention]

Figure 2:
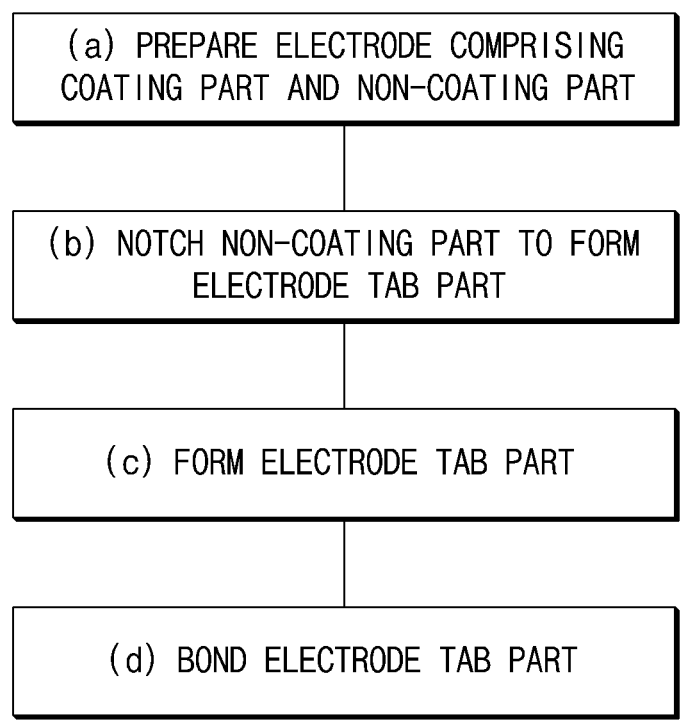
FIG. 2 is a flowchart illustrating a method for manufacturing the electrode according to the first embodiment of the present invention.

As illustrated in FIG. 2, a method for manufacturing an electrode according to the first embodiment of the present invention comprises a step (a) of preparing a unfinished electrode comprising a coating part coated with an electrode active material and a non-coating part to which the electrode active material is not applied, a step (b) of notching the non-coating part to form an electrode tab part, and a step (c) of forming the electrode tab part.

Figure 3A:
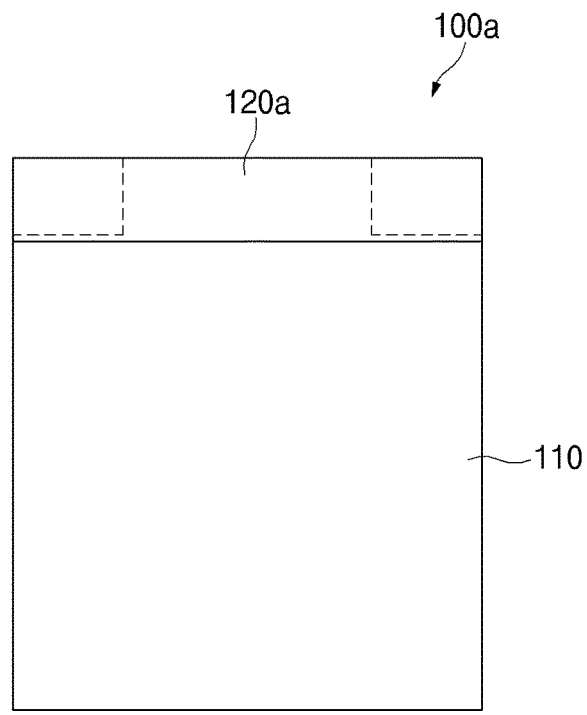

Referring to FIG. 3A, in the step (a), the unfinished electrode 100a comprising the coating part 110 coated with the electrode active material on one side thereof and the non-coating part 120a, to which the electrode active material is not applied, on the other side thereof is prepared.

Figure 3B:
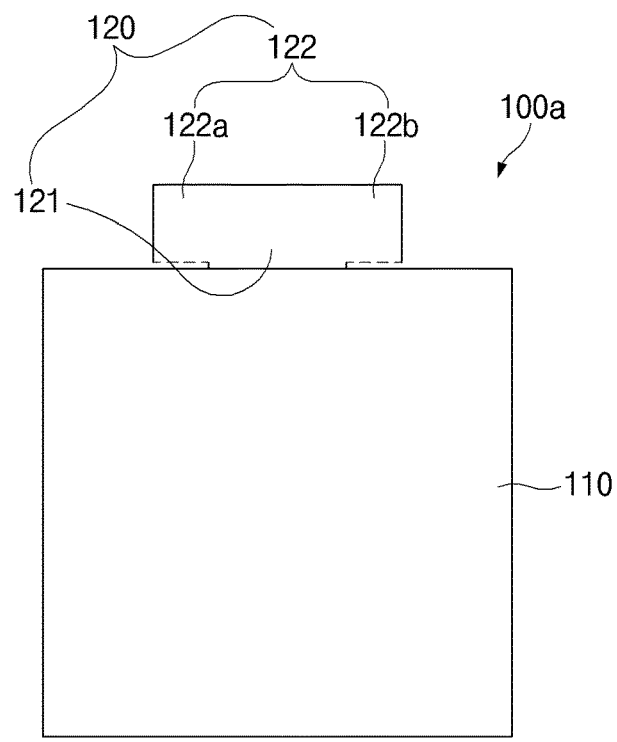

Referring to FIG. 3B, in the step (b), the non-coating part 120a formed on the unfinished electrode 100a is notched to form the electrode tab part 120. The electrode tab part 120 comprises a first electrode tab 121 connected to one side of the coating part 110 and a second electrode tab 122 connected to the first electrode tab 121. Here, the second electrode tab 122 comprises a first connection piece 122a connected to one side surface of the first electrode tab 121 and a second connection piece 122b connected to the other side surface of the second electrode tab 121.

In more detail, the step (b) comprises a first process of notching the non-coating part 120a along a dotted line displayed in FIG. 3A and a second process of notching the non-coating part 120a along a dotted line displayed in FIG. 3B. Here, in the second process, each of both sides of the boundary formed between the non-coating part 120a and the coating part 110 is notched at each of quarters of the boundary, or notches are formed up to a quarter of the boundary at opposite ends of the boundary. As a result, the electrode tab part 120*b* comprising the first electrode tab 121 connected to the coating part 110 and the second electrode tab 122 comprising the first and second connection pieces 122*a* and 122*b* respectively connected to both side surfaces of the first electrode tab 121.

Figure 3C:
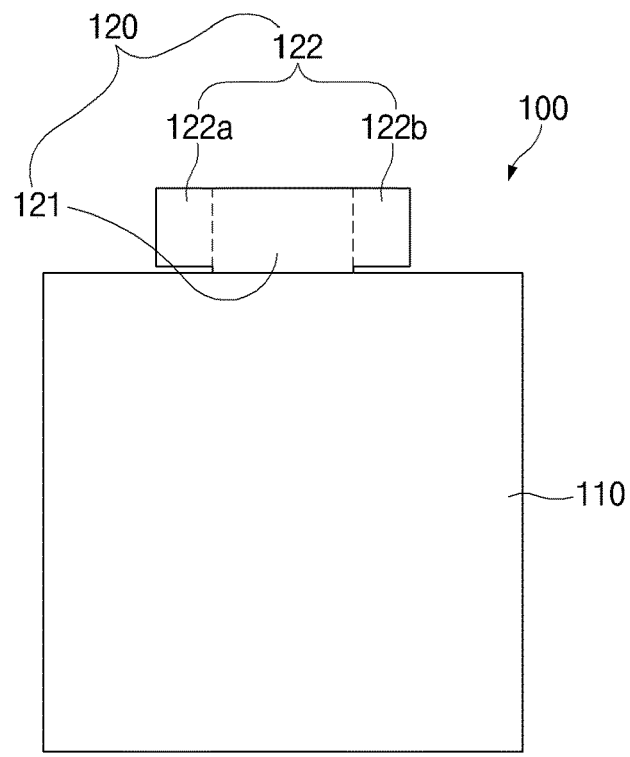
Figure 3D:
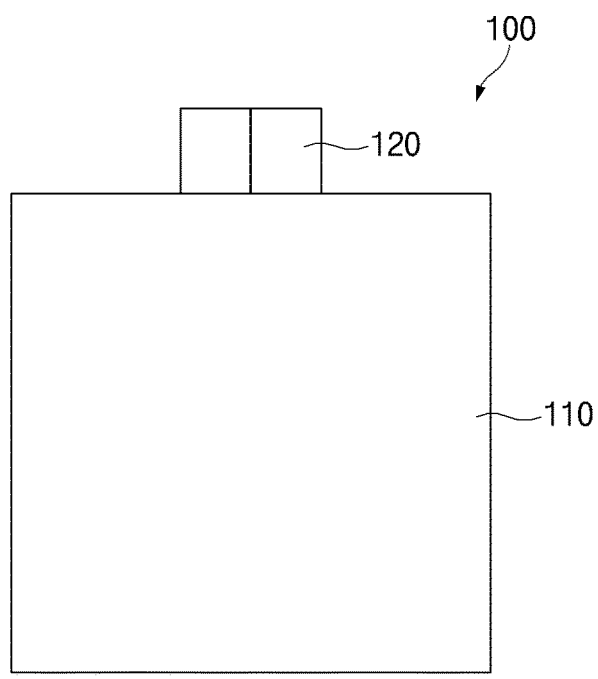

As illustrated in FIG. 3C, in the step (c), the second electrode tab 122 is bent in a direction of the first electrode tab 121 to allow the second electrode tab 122 to overlap one surface of the first electrode tab 121. Thus, as illustrated in FIG. 3D, the electrode tab part 120 may be completed.

After the step (c), a step (d) of bonding the overlapping first and second electrode tabs 121 and 122 to each other may be further performed. That is, in the step (d), the overlapping first and second electrode tabs 121 and 122 may be welded to be integrally bonded to each other. Thus, the first and second electrode tabs 121 and 122 may increase in adhesion force and bonding force.

Hereinafter, in descriptions of another embodiment of the present invention, constituents having the same configuration and function as the abovementioned embodiment have been given the same reference numeral in the drawings, and thus duplicated description will be omitted.

[Electrode Assembly According to Second Embodiment of the Present Invention]

Figure 4:
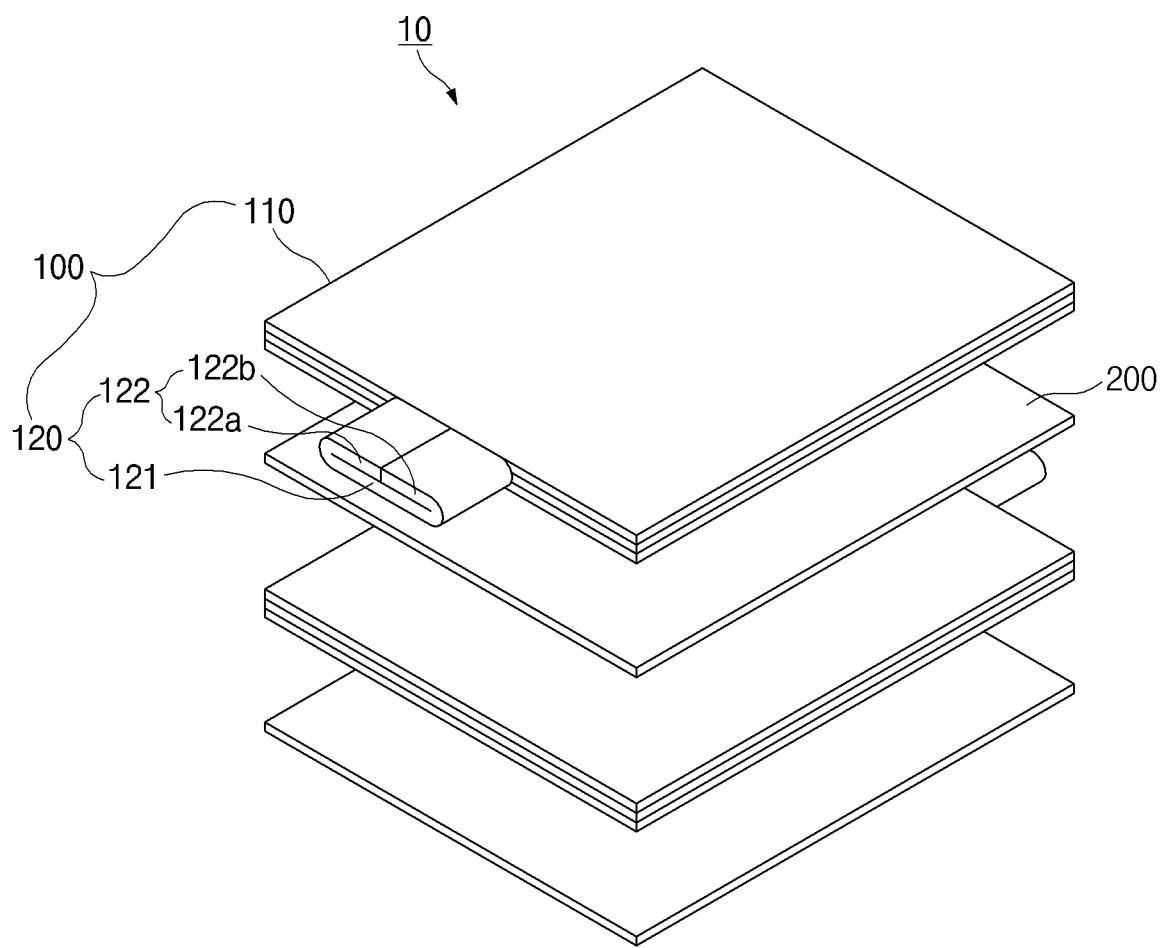
FIG. 4 is an exploded perspective view of an electrode assembly according to a second embodiment of the present invention.

As illustrated in FIG. 4, an electrode assembly 10 according to a second embodiment of the present invention comprises a plurality of electrodes 100 and a separator 200 interposed between the plurality of electrodes 100. The plurality of electrodes 100 comprise a coating part 110 coated with an electrode active material and an electrode tab part 120 connected to one side of the coating part 110.

Here, in the electrode assembly 10 according to the second embodiment of the present invention, the electrode tab part 120 comprises a first electrode tab 121 connected to one side of the coating part 110 and a second electrode tab 122 connected to the first electrode tab 121 and bent in a direction of the first electrode tab 121 to overlap one surface of the first electrode tab 121.

The electrode tab part 120 has the same configuration and function as the electrode tab part according to the first embodiment, and thus, its detailed description will be omitted.

In the electrode assembly 10 having the above-described configuration according to the second embodiment of the present invention, the electrode tab part 120 formed on the electrode 100 may increase in rigidity to prevent or reduce the electrode tab part 120 from being bent or folded, thereby significantly reducing a defective rate of the electrode assembly 10. Particularly, when the electrode assembly is manufactured, the electrode 100 is transferred through a roller. Here, the electrode tab part 120 formed on the electrode 100 may be prevented from being caught by the roller to prevent or reduce the electrode tab part 120 from being folded or damaged.

[Secondary Battery According to Third Embodiment of the Present Invention]

Figure 5:
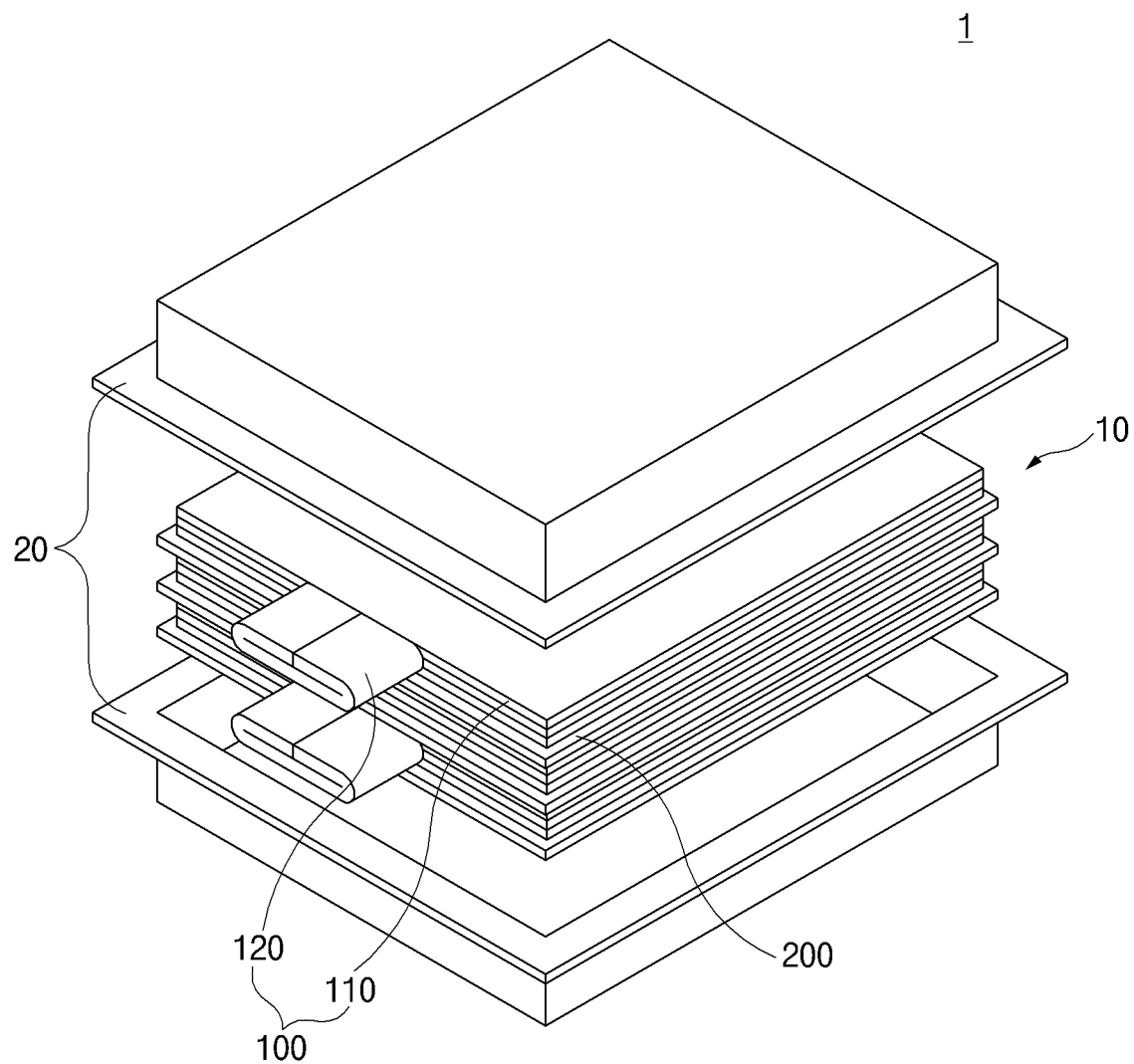
FIG. 5 is an exploded perspective view of a secondary battery according to a third embodiment of the present invention.

As illustrated in FIG. 5, a secondary battery 1 according to a third embodiment of the present invention comprises an electrode assembly 10 and a pouch 20 accommodating the electrode assembly 10. The electrode assembly 10 comprises a plurality of electrodes 100 and a separator 200 interposed between the plurality of electrodes 100. The plurality of electrodes 100 comprise a coating part 110 coated with an electrode active material and an electrode tab part 120 connected to one side of the coating part 110.

The electrode tab part 120 comprises a first electrode tab 121 connected to one side of the coating part 110 and a second electrode tab 122 connected to the first electrode tab 121 and bent in a direction of the first electrode tab 121 to overlap one surface of the first electrode tab 121.

Here, in the secondary battery 1 according to the third embodiment of the present invention, the electrode tab part 1 comprises a first electrode tab 121 connected to one side of the coating part 110 and a second electrode tab 122 connected to the first electrode tab 121 and bent in a direction of the first electrode tab 121 to overlap one surface of the first electrode tab 121.

The electrode tab part 120 has the same configuration and function as the electrode tab part according to the first embodiment, and thus, its detailed description will be omitted.

In the secondary battery 1 having the above-described configuration according to the second embodiment of the present invention, the electrode tab part 120 formed on the electrode 100 may increase in rigidity to prevent or reduce the electrode tab part 120 from being bent or folded, thereby significantly reducing a defective rate of the secondary battery 10.

[Electrode According to Fourth Embodiment of the Present Invention]

Figure 6:
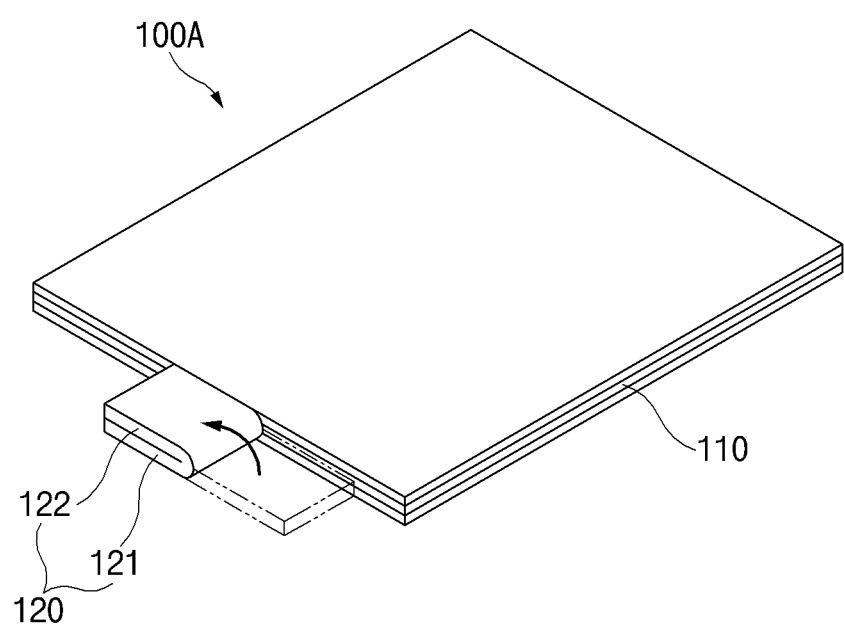
FIG. 6 is a perspective view of an electrode according to a fourth embodiment of the present invention.

As illustrated in FIG. 6, an electrode 100A according to a fourth embodiment of the present invention comprises a coating part 110 coated with an electrode active material and an electrode tab part 120 provided on one side of the coating part 110. The electrode tab part 120 comprises a first electrode tab 121 connected to one side of the coating part 110 and a second electrode tab 122 connected to the first electrode tab 121 and bent in a direction of the first electrode tab 121 to overlap one surface of the first electrode tab 121.

Here, the second electrode tab 122 is connected to one side surface of the first electrode tab 121 (a right surface of the first electrode tab when viewed in FIG. 6) and bent in a direction of the first electrode tab 121 (a direction of a top surface of the first electrode tab when viewed in FIG. 6) to overlap one surface of the first electrode tab 121.

Thus, in the electrode 100A according to the fourth embodiment of the present invention, the first electrode tab part 120 may be more easily notched and bent to improve work efficiency.

[Electrode According to Fifth Embodiment of the Present Invention]

Figure 7:
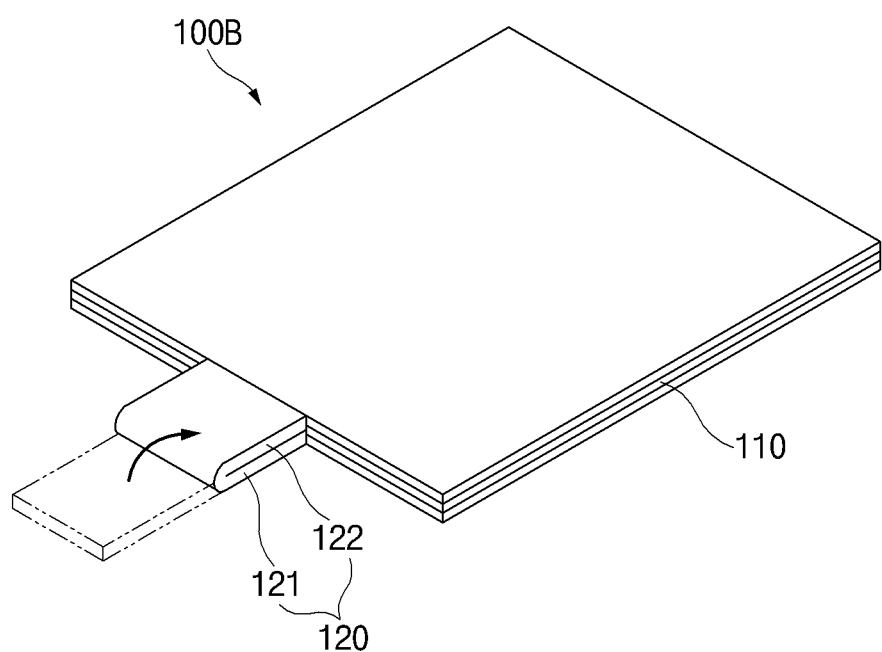
FIG. 7 is a perspective view of an electrode according to a fifth embodiment of the present invention.

As illustrated in FIG. 7, an electrode 100B according to a fifth embodiment of the present invention comprises a coating part 110 coated with an electrode active material and an electrode tab part 120 provided on one side of the coating part 110. The electrode tab part 120 comprises a first electrode tab 121 connected to one side of the coating part 110 and a second electrode tab 122 connected to the first electrode tab 121 and bent in a direction of the first electrode tab 121 to overlap one surface of the first electrode tab 121.

Here, the second electrode tab 122 may be connected to a front end surface of the first electrode tab 121 and bent in the direction of the first electrode tab 121 to overlap the one surface of the first electrode tab 121.

Thus, in the electrode 100B according to the fifth embodiment of the present invention, the first electrode tab part 120 may be more easily notched and bent to improve work efficiency.

[Electrode According to Sixth Embodiment of the Present Invention]

Figure 8:
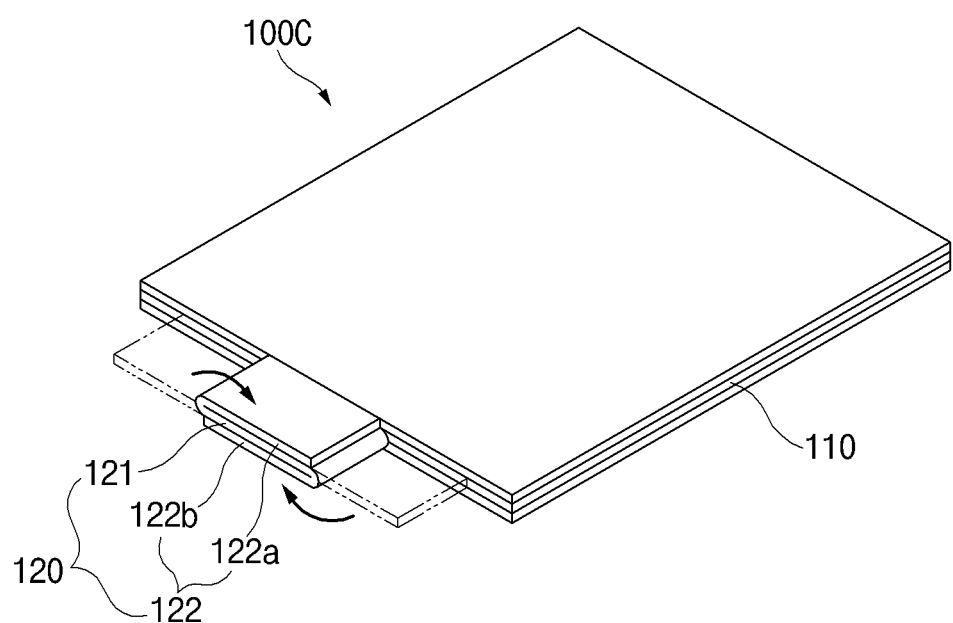
FIG. 8 is a perspective view of an electrode according to a sixth embodiment of the present invention.

As illustrated in FIG. 8, an electrode 100C according to a sixth embodiment of the present invention comprises a coating part 110 coated with an electrode active material and an electrode tab part 120 provided on one side of the coating part 110. The electrode tab part 120 comprises a first electrode tab 121 connected to one side of the coating part 110 and a second electrode tab 122 connected to the first electrode tab 121 and bent in a direction of the first electrode tab 121 to overlap one surface of the first electrode tab 121.

The second electrode tab comprises first and second connection pieces respectively connected to both side surfaces of the first electrode tab. The first connection piece is bent in a direction of one surface of the first electrode tab to overlap the one surface of the first electrode tab, and the second connection piece is bent in a direction of the other surface of the first electrode tab to overlap the other surface of the first electrode tab.

Thus, in the electrode 100C according to the sixth embodiment of the present invention, the electrode tab part 120 may significantly increase in rigidity.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. An electrode comprising:
a coating part coated with an electrode active material; and
an electrode tab part provided on one side of the coating part,
wherein the electrode tab part comprises:
a first electrode tab connected to the one side of the coating part and extending directly from the coating part in a first direction; and
a second electrode tab connected to the first electrode tab, extending from the first electrode tab in a second direction perpendicular to the first direction and bent in a direction of the first electrode tab to contact and entirely overlap a top surface of the first electrode tab,
wherein the second electrode tab comprises first and second connection pieces respectively connected to both side surfaces of the first electrode tab, and
wherein the first and second connection pieces are bent toward the top surface of the first electrode tab to correspondingly overlap the top surface of the first electrode tab.

2. The electrode of claim 1, wherein corresponding surfaces of the first and second connection pieces overlapping the first electrode tab are adjacent to each other.

3. The electrode of claim 1, wherein the second electrode tab is connected to a front end surface of the first electrode tab and bent in the direction of the first electrode tab to overlap the top surface of the first electrode tab.

4. The electrode of claim 1, wherein the first electrode tab and the second electrode tab have the same area.

5. The electrode of claim 1, wherein the first electrode tab and the second electrode tab are integrally bonded to each other through welding.

6. An electrode assembly comprising:
the electrode of claim 1 provided in plural; and
a separator interposed between the plurality of electrodes.

7. An electrode comprising:
a coating part coated with an electrode active material; and
an electrode tab part provided on one side of the coating part,
wherein the electrode tab part comprises:
a first electrode tab connected to the one side of the coating part and extending directly from the coating part in a first direction; and
a second electrode tab connected to the first electrode tab, extending from the first electrode tab in a second direction perpendicular to the first direction and bent toward the first electrode tab to contact and overlap a top surface of the first electrode tab entirely,
wherein the second electrode tab comprises first and second connection pieces respectively connected to both side surfaces of the first electrode tab,
wherein the first connection piece is bent in a direction of one surface of the first electrode tab to overlap the one surface of the first electrode tab, and
wherein the second connection piece is bent toward an other surface of the first electrode tab to overlap the other surface of the first electrode tab entirely.

8. An electrode assembly comprising:
a plurality of electrodes; and
a separator interposed between the plurality of electrodes,
wherein each of the plurality of electrodes comprises:
a coating part coated with an electrode active material; and
an electrode tab part connected to one side of the coating part, and
wherein the electrode tab part comprises:
a first electrode tab connected to the one side of the coating part and extending directly from the coating part in a first direction; and
a second electrode tab connected to the first electrode tab, extending from the first electrode tab in a second direction perpendicular to the first direction and bent toward the first electrode tab to contact and entirely overlap a top surface of the first electrode tab,
wherein the second electrode tab comprises first and second connection pieces respectively connected to both side surfaces of the first electrode tab, and
wherein the first and second connection pieces are bent toward the top surface of the first electrode tab to correspondingly overlap the top surface of the first electrode tab.

* * * * *